(12) United States Patent
Merkle et al.

(10) Patent No.: US 8,211,488 B2
(45) Date of Patent: *Jul. 3, 2012

(54) PROCESS TO PREPARE A PREMIUM FORMULATED FRIED EGG

(75) Inventors: Jonathan A. Merkle, Cologne, MN (US); Hershell R. Ball, Jr., Salisbury, NC (US); Jason W. Mathews, Gaylord, MN (US)

(73) Assignee: Michael Foods of Delaware, Inc., Minnetonka, MN (US)

( * ) Notice: Subject to any disclaimer, the term of this patent is extended or adjusted under 35 U.S.C. 154(b) by 109 days.

This patent is subject to a terminal disclaimer.

(21) Appl. No.: 12/762,494

(22) Filed: Apr. 19, 2010

(65) Prior Publication Data

US 2010/0203201 A1 Aug. 12, 2010

Related U.S. Application Data

(63) Continuation of application No. 11/971,011, filed on Jan. 8, 2008, now Pat. No. 7,709,039, which is a continuation of application No. 11/150,034, filed on Jun. 10, 2005, now Pat. No. 7,338,681, which is a continuation of application No. 10/161,046, filed on May 31, 2002, now abandoned.

(60) Provisional application No. 60/342,405, filed on Dec. 21, 2001.

(51) Int. Cl.
 *A23L 1/32* (2006.01)
(52) U.S. Cl. .......................................... 426/614; 426/89
(58) Field of Classification Search .................. 426/614, 426/89

See application file for complete search history.

(56) References Cited

U.S. PATENT DOCUMENTS

| 1,756,189 A | 4/1930 | Fousek |
| 1,900,444 A | 3/1933 | Heuser |
| 1,929,919 A | 10/1933 | Ekstedt ............................. 107/8 |
| 1,989,359 A | 1/1935 | Heuser .............................. 99/11 |
| 2,000,384 A | 5/1935 | Frantz ............................. 107/54 |
| RE19,898 E | 3/1936 | Fousek ....................... 426/330.1 |
| 2,093,786 A | 9/1937 | Swarthout ....................... 99/113 |

(Continued)

FOREIGN PATENT DOCUMENTS

EP 0157619 4/1985

(Continued)

OTHER PUBLICATIONS

Loit Company Brochure, date unknown.

(Continued)

*Primary Examiner* — Anthony Weier

(74) *Attorney, Agent, or Firm* — Fredrikson & Byron, P.A.

(57) ABSTRACT

The present invention relates to the formulation and process for preparation of a fried egg product which may be frozen for future heating within a microwave or other oven for consumption by an individual. Various ingredients are added and mixed to each of the liquid egg white and liquid yolk portions. The liquid egg white portion is preheated and then deposited within a mold for slow cooking under controlled temperature and humidity conditions. The liquid yolk portion is preheated and then is added to the mold for placement on the egg white portion. Following a short period of cooking the mold containing the formulated fried eggs is transported to a freezer unit for freezing, packaging, and storage. At a future time the frozen formulated fried egg product may be retrieved for thawing and cooking for consumption by an individual.

34 Claims, 2 Drawing Sheets

U.S. PATENT DOCUMENTS

| | | | | |
|---|---|---|---|---|
| 2,159,246 | A | 5/1939 | Beyer | 107/54 |
| 2,234,526 | A | 3/1941 | Guldbech | 107/54 |
| 2,395,587 | A | 2/1946 | Scott | 99/113 |
| 2,463,112 | A | 3/1949 | Kipnis | 107/54 |
| 2,481,711 | A | 9/1949 | Bemis | 426/510 |
| 2,565,311 | A | 4/1951 | Koonz | 99/161 |
| 2,593,577 | A | 4/1952 | Lewis | 99/4 |
| 2,848,334 | A | 8/1958 | Jones | 99/113 |
| 2,902,396 | A | 9/1959 | Reynolds | 428/337 |
| 2,920,966 | A | 1/1960 | Heinemann | 99/113 |
| 3,027,852 | A | 4/1962 | Key | 107/8 |
| 3,038,418 | A | 6/1962 | Gugler | 107/8 |
| 3,043,700 | A | 7/1962 | Szczesniak | 99/92 |
| 3,113,872 | A | 12/1963 | Jones | 99/161 |
| 3,212,906 | A | 10/1965 | Jones | 99/161 |
| 3,260,606 | A | 7/1966 | Azuma | 99/113 |
| 3,293,044 | A | 12/1966 | Torr | 99/113 |
| 3,404,008 | A | 10/1968 | Ballas | 99/161 |
| 3,409,446 | A | 11/1968 | Olpen | 99/210 |
| 3,459,560 | A | 8/1969 | Shea | 99/92 |
| 3,522,777 | A | 8/1970 | Schafer | 107/8 |
| 3,547,658 | A | 12/1970 | Melnick | 426/120 |
| 3,594,183 | A | 7/1971 | Melnick | 426/573 |
| 3,640,731 | A | 2/1972 | Kaplow | 99/113 |
| 3,640,732 | A | 2/1972 | Johnson | 99/114 |
| 3,652,397 | A | 3/1972 | Pardun | 195/30 |
| 3,655,405 | A | 4/1972 | Karas | 99/94 |
| 3,662,672 | A | 5/1972 | Hoer | 99/17 |
| 3,697,290 | A | 10/1972 | Lynn | 99/86 |
| 3,864,500 | A | 2/1975 | Lynn | 426/195 |
| 3,889,012 | A | 6/1975 | Riviere | 426/500 |
| 3,920,857 | A | 11/1975 | Barker | 426/307 |
| 3,941,892 | A * | 3/1976 | Glasser et al. | 426/104 |
| 3,958,034 | A | 5/1976 | Nath | 426/614 |
| 3,982,040 | A | 9/1976 | Oborn | 426/614 |
| 3,987,212 | A | 10/1976 | Seeley | 426/614 |
| 4,000,323 | A | 12/1976 | Youngquist | 426/93 |
| 4,025,260 | A | 5/1977 | Neel | 425/131.1 |
| 4,034,124 | A | 7/1977 | Van Dam | 426/602 |
| 4,046,922 | A | 9/1977 | Burkwall | 426/104 |
| 4,068,013 | A | 1/1978 | Brule | 426/565 |
| 4,157,404 | A | 6/1979 | Yano | 426/429 |
| 4,200,663 | A | 4/1980 | Seeley | 426/614 |
| 4,219,585 | A | 8/1980 | Herring | 426/614 |
| 4,234,614 | A | 11/1980 | Yano | 426/614 |
| D272,009 | S | 1/1984 | Zonnenberg | D1/13 |
| 4,428,971 | A | 1/1984 | Havette | 426/565 |
| 4,466,923 | A | 8/1984 | Friedrich | 260/412.4 |
| 4,478,866 | A | 10/1984 | Ohta | 426/549 |
| 4,493,854 | A | 1/1985 | Friedrich | 426/629 |
| 4,495,207 | A | 1/1985 | Christianson | 426/312 |
| 4,524,082 | A | 6/1985 | Liot | 426/312 |
| 4,524,083 | A | 6/1985 | Liot | 426/330.1 |
| 4,574,690 | A | 3/1986 | Chiao | 99/353 |
| 4,612,197 | A | 9/1986 | Postner | 426/47 |
| 4,618,499 | A | 10/1986 | Wainwright | 426/283 |
| 4,670,285 | A | 6/1987 | Clandinin | 426/602 |
| 4,703,060 | A | 10/1987 | Traitler | 514/549 |
| 4,714,571 | A | 12/1987 | Tremblay | 260/403 |
| D295,225 | S | 4/1988 | Ito | D1/125 |
| 4,746,521 | A | 5/1988 | Niwano | 426/241 |
| 4,776,173 | A | 10/1988 | Kamarei | 62/63 |
| 4,794,009 | A | 12/1988 | Dreisin | 426/283 |
| 4,808,425 | A | 2/1989 | Swartzel | 426/399 |
| 4,814,111 | A | 3/1989 | Kearns | 260/403 |
| 4,844,926 | A | 7/1989 | Hatanaka | 426/282 |
| 4,847,015 | A | 7/1989 | Shigematsu | 260/403 |
| 4,857,329 | A | 8/1989 | Sako | 424/195.1 |
| 4,879,125 | A | 11/1989 | Pak | 426/120 |
| 4,880,573 | A | 11/1989 | Courregelongue | 260/420 |
| 4,880,639 | A | 11/1989 | Lauermann | 426/2 |
| 4,925,637 | A | 5/1990 | Julien | 426/2 |
| 4,957,760 | A | 9/1990 | Swartzel | 426/399 |
| 4,957,768 | A | 9/1990 | Dutilh | 426/604 |
| 4,994,291 | A | 2/1991 | Swartzel | 426/399 |
| 4,997,668 | A | 3/1991 | Johnson | 426/580 |
| 5,024,846 | A | 6/1991 | McLachlan | 426/312 |
| 5,026,565 | A | 6/1991 | McLachlan | 426/241 |
| 5,028,448 | A | 7/1991 | Ros | 426/614 |
| 5,037,661 | A | 8/1991 | Merchant | 426/47 |
| 5,061,505 | A | 10/1991 | Cully | 426/601 |
| 5,063,070 | A | 11/1991 | Klemann | 426/271 |
| 5,064,668 | A | 11/1991 | Klemann | 426/271 |
| 5,073,267 | A | 12/1991 | Adda | 210/634 |
| 5,073,399 | A | 12/1991 | Vassiliou | 426/614 |
| 5,082,674 | A | 1/1992 | Carrell | 426/52 |
| 5,084,215 | A | 1/1992 | Kearns | 260/403 |
| 5,091,117 | A | 2/1992 | Athnasios | 260/428 |
| 5,092,964 | A | 3/1992 | Conte | 203/29 |
| 5,097,017 | A | 3/1992 | Konwinski | 530/378 |
| 5,116,628 | A | 5/1992 | Ogasahara | 426/330.1 |
| 5,120,556 | A | 6/1992 | Fujimoto | 426/330.3 |
| 5,120,559 | A | 6/1992 | Rizvi | 426/446 |
| 5,130,155 | A | 7/1992 | Yamate | 426/330.1 |
| 5,132,288 | A | 7/1992 | Johnson | 514/11 |
| 5,147,672 | A | 9/1992 | McLachlan | 426/241 |
| 5,151,188 | A | 9/1992 | Hoppet | 210/634 |
| 5,213,968 | A | 5/1993 | Castle | 435/68.1 |
| 5,227,189 | A | 7/1993 | Vassiliou | 426/614 |
| 5,238,694 | A | 8/1993 | Ogasahara | 426/330.1 |
| 5,246,717 | A | 9/1993 | Garwin | 426/2 |
| 5,262,190 | A | 11/1993 | Cunningham | 426/549 |
| 5,268,442 | A | 12/1993 | Bradshaw | 528/25 |
| 5,283,072 | A | 2/1994 | Cox | 426/312 |
| 5,287,632 | A | 2/1994 | Heit | 34/9 |
| 5,288,619 | A | 2/1994 | Brown | 435/134 |
| 5,290,583 | A | 3/1994 | Reznik | 426/614 |
| 5,302,405 | A | 4/1994 | Hsieh | 426/271 |
| 5,304,546 | A | 4/1994 | Comini | 552/545 |
| 5,378,487 | A | 1/1995 | Merchant | 426/580 |
| 5,399,369 | A | 3/1995 | Singer | 426/417 |
| 5,403,898 | A | 4/1995 | Bradshaw | 525/474 |
| 5,470,377 | A | 11/1995 | Whitlock | 95/90 |
| 5,478,585 | A | 12/1995 | Isono | 426/417 |
| 5,487,911 | A | 1/1996 | Ueda | 426/614 |
| 5,514,401 | A | 5/1996 | Zeidler | 426/429 |
| 5,552,173 | A | 9/1996 | Singh | 426/417 |
| 5,584,989 | A | 12/1996 | Jameson | 210/137 |
| 5,589,211 | A | 12/1996 | Cox | 426/298 |
| 5,599,381 | A | 2/1997 | Whitlock | 95/90 |
| 5,601,707 | A | 2/1997 | Clay | 210/198.2 |
| 5,616,352 | A | 4/1997 | Heidlas | 426/312 |
| 5,620,735 | A | 4/1997 | Manderfeld | 426/614 |
| 5,647,976 | A | 7/1997 | Rothe | 210/137 |
| 5,653,885 | A | 8/1997 | Jameson | 210/634 |
| 5,656,319 | A | 8/1997 | Barclay | 426/574 |
| 5,665,416 | A | 9/1997 | Manderfeld | 426/614 |
| 5,670,614 | A | 9/1997 | Roby | 528/480 |
| 5,676,737 | A | 10/1997 | Whitlock | 95/90 |
| 5,690,828 | A | 11/1997 | Clay | 210/634 |
| 5,718,937 | A | 2/1998 | Heidlas | 426/533 |
| D391,737 | S | 3/1998 | Wright | D1/125 |
| 5,738,498 | A | 4/1998 | Allington | 417/53 |
| 5,750,679 | A | 5/1998 | Haas | 536/127 |
| 5,755,559 | A | 5/1998 | Allington | 417/53 |
| 5,759,549 | A | 6/1998 | Hiltunen | 424/195.1 |
| 5,780,095 | A | 7/1998 | Jackeschky | 426/614 |
| 5,783,243 | A | 7/1998 | Benado | 426/425 |
| 5,843,311 | A | 12/1998 | Richter | 210/634 |
| 5,880,300 | A | 3/1999 | Kodali | 554/190 |
| 5,882,565 | A | 3/1999 | Wood | 264/209.5 |
| 5,932,276 | A | 8/1999 | Bhatia | 426/614 |
| 6,235,330 | B1 | 5/2001 | Scherpf | 426/302 |
| 7,288,279 | B2 | 10/2007 | Merkle | 426/614 |
| 7,338,681 | B2 * | 3/2008 | Merkle et al. | 426/614 |

FOREIGN PATENT DOCUMENTS

| | | |
|---|---|---|
| EP | 0371856 | 11/1988 |
| EP | 0387708 | 3/1990 |
| EP | 0426425 | 10/1990 |
| EP | 0493045 | 12/1991 |
| EP | 0503293 | 2/1992 |
| EP | 05311041 | 9/1992 |
| EP | 0545025 | 10/1992 |
| EP | 0611281 | 5/1993 |
| GB | 1525929 | 11/1974 |
| JP | 59-37060 | 1/1977 |

| | | |
|---|---|---|
| JP | 59-135847 | 1/1983 |
| JP | 60-105471 | 11/1983 |
| JP | 60-163570 | 7/1985 |
| JP | 62-262998 | 11/1987 |
| JP | 2-283263 | 4/1989 |
| JP | 61-106329 | 5/1996 |
| WO | WO 92/22220 | 6/1992 |
| WO | WO 96/39873 | 5/1996 |

OTHER PUBLICATIONS

Cutler Egg Products Brochure, date unknown.
Sugihara et al, "Heat Pasteurization of liquid Whole Egg", Food Technology, vol. 20 No. 8 pp. 100-107, Aug. 1966.
Ella M. Barnes, "The Intestinal Microflora of Poultry and Game Birds During Life and After Storage", Journal of Applied bacteriology, vol. 46, pp. 407-419, 1979.
Robert Austrian, "Microbiology Including Immunology and Molecular Genetics Third Edition, Chapter 25, Chemotherapy of Bacterial Diseases", pp. 574-584, date unknown.
G.W. Froning et al, "Extraction of Cholesterol and Other Lipids from Dried Egg Yolk Using Supercritical Carbon Dioxide", Journal of Food Science, vol. 55 No. 1, pp. 95-98, 1990.
Stadelman et al. Egg Science and Technology Second Edition, AVI Publishing company, Inc. pp. 261-263, 1977.
Kenneth R. Swartzel, "Equivalent-Point Method for Thermal Evaluation of Continuous-Flow Systems", Agricultural and Food Chemistry, vol. 34, pp. 396-401, May/Jun. 1986.
Dr. F. DeMeester, "New Developments in Yolk-Containing Egg Powders", pp. 236-240, date unknown.
L. Kwan et al., "Fractionation of Water-Soluble and- Insoluble Components from Egg Yolk with Minimum Use of Organic Solvents", Journal of Food Science, 1991, vol. 56, No. 6, pp. 1537-1541, 1991.
Hatta et al, "Separation of Phospholipids from Egg Yolk and Recovery of Water-Soluble Proteins", Journal of Food Science, vol. 53, No. 2, pp. 425-431, 1988.
Fichtali et al, "Purification of Antibodies from Industrially Separated Egg Yolk", Journal of Food Science, vol. 58, No. 6, pp. 1282-1290, 1993.
Data for Papetti's Calcium Patent Information, "Cholesterol-Free, Fat-Free, Egg Central Location Test", Dec. 1999.
E. O. Essary et al., "New uses of Heated Aseptically Fluid Egg Products", Department of Food Science and Technology and Chemical Engineering, pp. 1-20, date unknown.
Clem Honer, Egg Processor Lays Claim to Latest Technology, Prepared Foods, pp. 122-123, Jul. 1989.
Basant B. Shah et al., Separation off Egg Yolk Proteins and Lipids with Carboxymethyl Cellulose, Journal of Food Processing and Preservation, vol. 16, pp. 275-288, 1992.
Makoto Shimizu et al. Egg Yolk Antibody (IgY) Stability in Aqueous Solution with high Sugar Concentrations, Journal of Food Science, vol. 59, No. 4, 1994, pp. 763-766, 1994.
Hideaki Yokoyama et al, A Two-Step Procedure for Purification of Hen Egg Yolk Immunoglobulin G: Utilization of Hydrozypropylmethylcellulose Phthalate and Synthetic Affinity Ligand Gel (Avid AL), Immunology Research Institute in Gifu, vol. 72, pp. 275-281, 1993.
Tokarska et al, "Extraction of Egg Yolk Oil of Reduced Cholesterol Content", Canadian Institute Food Science and Technology, vol. 18, No. 3, 1985.
E.M. Akita et al, "Immunoglobulins from Egg Yolk; Isolation and Purification", Journal of Food Science, vol. 57, No. 3, 1992, pp. 629-634.
A. Paraskevopoulou et al, "Texture Profile Analysis of heat-Formed Gels and Cakes Prepared with Low Cholesterol Egg Yolk Concentrates", Journal of Food Science, vol. 62, No. 1, pp. 208-211, 1997.
Abalo C. Awade, "On hen egg fractionation: applications of liquid chromatography to the isolation and the purification of hen egg white and egg yolk proteins", Lebensm Unters Unters Forsch vol. 202, pp. 1-14, 1996.
Ladislav Kolarovic et al, "A Comparison of Extraction Methods for the Isolation of Phospholipids from Biological Sources", Analytical Biochemistry, vol. 156, pp. 244-250, 1986.
A. Parakevopoulou et al, "Cholesterol and Other Lipid Extraction from Egg Yolk Using Organic Solvents: Effects on Functional Properties of Yolk", Journal of Food Science, vol. 59, No. 4, pp. 766-768, 1994.

* cited by examiner

PROCESS TO PREPARE A PREMIUM FORMULATED FRIED EGG

The present application claims priority to U.S. patent application Ser. No. 11/971,011, filed on Jan. 8, 2008, now U.S. Pat. No. 7,709,039, which is a continuation of U.S. patent application Ser. No. 11/150,034, filed on Jun. 10, 2005, now U.S. Pat. No. 7,338,681 which is a continuation of U.S. patent application Ser. No. 10/161,046, filed May 31, 2002, now abandoned, which claims priority to U.S. Provisional Patent Application No. 60/342,405 filed Dec. 21, 2001, all of which the entire contents are incorporated by reference herein.

BACKGROUND OF THE INVENTION

The present invention is directed to a formulation for a fried egg product and process to prepare a premium formulated fried egg for consumption by an individual. It is anticipated that the formulated fried egg product will be refrigerated and/or frozen for future heating within a microwave, convection oven or griddle for consumption as a stand alone food item or as a portion of a composite food article. The formulated fried egg has a texture and other sensory perceptions similar to a naturally fried egg.

In the past, formulated fried eggs have been formed by the filling of a mold with a liquid egg mixture and then cooking the liquid egg mixture within the mold. Many problems have arisen through the implementation of this processing methodology. Formulated fried eggs produced according to the above identified methods unfortunately have the appearance and taste of commercial processing. Frequently these food articles after cooking are extremely dense having poor viscosity. Formulated fried eggs cooked within a mold generally exhibit undesirable sensory perceptions related to the appearance, taste and texture as compared to a freshly fried egg. A need therefore exists to eliminate the dense commercial processing appearance and taste associated with a formulated fried egg product as cooked within a mold.

In the past procedures have generally not been implemented to rigorously control the processing and cooking parameters utilized to yield a formulated fried egg. A need exists to develop a formulated fried egg which is more appealing in appearance and taste and which is susceptible to freezing and reheating within a conventional or microwave heating prior to consumption by an individual.

In the past the freezing and/or extended refrigeration of a formulated fried egg has lead to a loss of a cohesive texture and the degradation of other sensory perceptions such as mouth feel, taste, elasticity, and/or the food product not being tender or appealing to an individual.

Another common problem encountered during delayed consumption, extended refrigeration and/or freezing of a formulated fried egg is that the food product exhibits syneresis, or the loss of water when frozen and reheated, or when stored for an extended period of time.

In the past, temperature variations during the cooking procedure for the formulated fried eggs have caused a degradation in the viscosity, loss of elasticity, and have resulted is a non-smooth, non-cohesive texture. In addition, temperature variations have caused the formulated fried egg to be not tender and fail to easily fracture and break during attempts to rupture the egg yolk portion of the formulated fried egg. The cooking of the formulated fried egg at an elevated temperature, to minimize the duration of the cooking time, frequently results in the burning and degradation of the texture of the formulated fried egg. Also, during rapid cooking the formulated fried eggs easily dehydrate and form a crust which is unappealing to an individual.

The rate of cooking of the formulated fried eggs and the temperature of the oven, or other cooking vessel, also frequently cause the formation of an excessive volume of air bubbles, which in turn, interrupt the structure of the formulated fried egg destroying the smooth, cohesive texture. The loss of a smooth cohesive texture causes an undesirable mouth feel when consumed by an individual. The existence of undesirable and/or excessive air bubbles may also occur when the pH of the formulated fried eggs is at an improper level, preventing the egg whites from retaining carbon dioxide as carbonic acid. The reduction in the amount of carbon dioxide and/or carbonic acid causes the mixing and/or shearing of the egg whites during processing due to undesirable gas entrapment.

In the past the cooking of formulated fried eggs has frequently caused an iron-sulfide greening reaction resulting in undesirable coloration and a degradation in the taste for the egg product.

It is also desirable to provide a formulated fried egg which is natural in appearance. In the past formulated fried eggs have included a symmetrically located egg yolk portion as centrally positioned within a substantially round egg white portion. These types of formulated fried eggs do not appear to be natural. Natural fried eggs experience random yolk positioning and non-symmetrical egg white portions.

The known formulated fried egg processing techniques frequently cause freezing and/or thawing damage to frozen eggs and fail to retain the egg yolk portions in a semi-liquid state after freezing and subsequent thawing and heating. As a result the egg yolk portions of the known formulated fried eggs have not readily fractured, have not provided a semi-liquid state, nor have provided a desired elastic texture.

BRIEF DESCRIPTION OF THE INVENTION

The present invention relates to the formulation and process for preparation of a fried egg product which may be refrigerated and/or frozen for future heating within a microwave or other oven for consumption by an individual. The process involves the initial step of acquisition of liquid eggs which may be separated into liquid egg white and liquid egg yolk portions. Various ingredients are added and mixed to each of the liquid egg white and liquid yolk portions. The liquid egg white portion is preheated and then deposited within a mold for slow cooking under controlled temperature and humidity conditions. The liquid yolk portion is preheated and then is added to the mold for placement on the egg white portion. Following a short period of cooking, the mold containing the cooked egg white and egg yolk are cooled and then transported to a freezer unit for freezing. The frozen formulated fried egg is then separated from the mold for packaging, and storage. At a future time the frozen formulated fried egg product may be retrieved for thawing and cooking for consumption by an individual. The formulated fried egg product made according to the parameters described herein yields a enhanced fried egg product having sensory perceptions and the appearance of a naturally fried egg.

The liquid egg white portions, the liquid yolk portions and additional ingredients are individually mixed under controlled conditions to avoid over mixing and/or over gassing of the liquid egg portions which would adversely affect the quality of the end product. Alternatively, the formulated fried egg product following cooling and freezing may be separated from the mold for storage within a freezer or refrigerated for future reheating and consumption by an individual.

A principle advantage of the present invention is to create a formulated fried egg product having improved texture.

Another principle advantage of the present invention is to create a formulated fried egg product which has a homemade look for the reheated fried eggs.

Still another principle advantage of the present invention is to create a formulated fried egg product which may be formed through the use of commercially available equipment.

Still another principle advantage of the present invention is to create a formulated fried egg product which has a light and airy texture resembling naturally fried eggs.

Still another principle advantage of the present invention is to create a formulated fried egg product which has a more appetizing appearance.

Still another principle advantage of the present invention is to provide an improved formulated fried egg product formed from relatively simple and inexpensive ingredients and processing equipment which fulfills the intended purpose of enhancing the appeal and appearance of a formulated fried egg product without fear of damage to the food article and/or food processing equipment and/or illness to individuals.

Still another principle advantage of the present invention is the addition of modified food starch to a formulated fried egg product to enhance the quality of the food article.

Still another principle advantage of the present invention is the addition of gums to improve the appeal of the food article.

Still another principle advantage of the present invention the use of FDA approved ingredients for formulation of a fried egg product.

Still another advantage of the present invention is the provision of the efficient control of mixing and cooking paramaters to formulate a desired quality of formulated fried egg product.

Still another advantage of the principle invention is the provision of a formulated fried egg product which may be held as frozen, refrigerated, and/or hot for extended periods of time without loss of product integrity to minimize waste.

Still another principle advantage of the present invention is the provision of a formulated fried egg product which has been processed over specific durations of time.

Still another advantage of the principle invention is the provision of a superior formulated fried egg product which includes integrity characteristics not found in other food articles within the same product classification.

Still another advantage of the principle invention is the provision of a formulated fried egg product having enhanced product consistency which is not found in other food articles within the same product classification.

Still another advantage of the principle invention is the provision of a formulated fried egg product which remains intact following refrigeration and/or freezing and subsequent reheating for consumption by an individual.

Still another principle advantage of the present invention is the provision of a formulated fried egg product having improved texture and flavor as related to other food articles within the same product classification.

Still another principle advantage of the present invention is the provision of a formulated fried egg product which minimizes sogginess of the egg product during processing, cooling, refrigeration, and/or freezing and subsequent storage for further reheating prior to consumption by an individual.

DETAILED DESCRIPTION OF THE INVENTION

Figure 1:
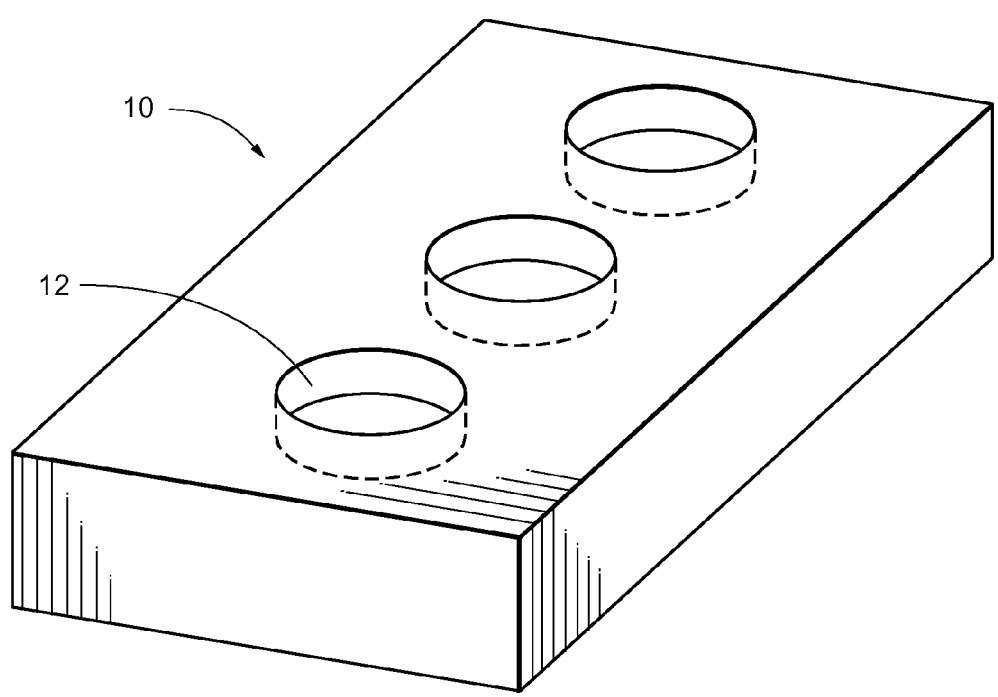
FIG. 1 shows a mold utilized to cook the formulated fried egg.
Figure 2:
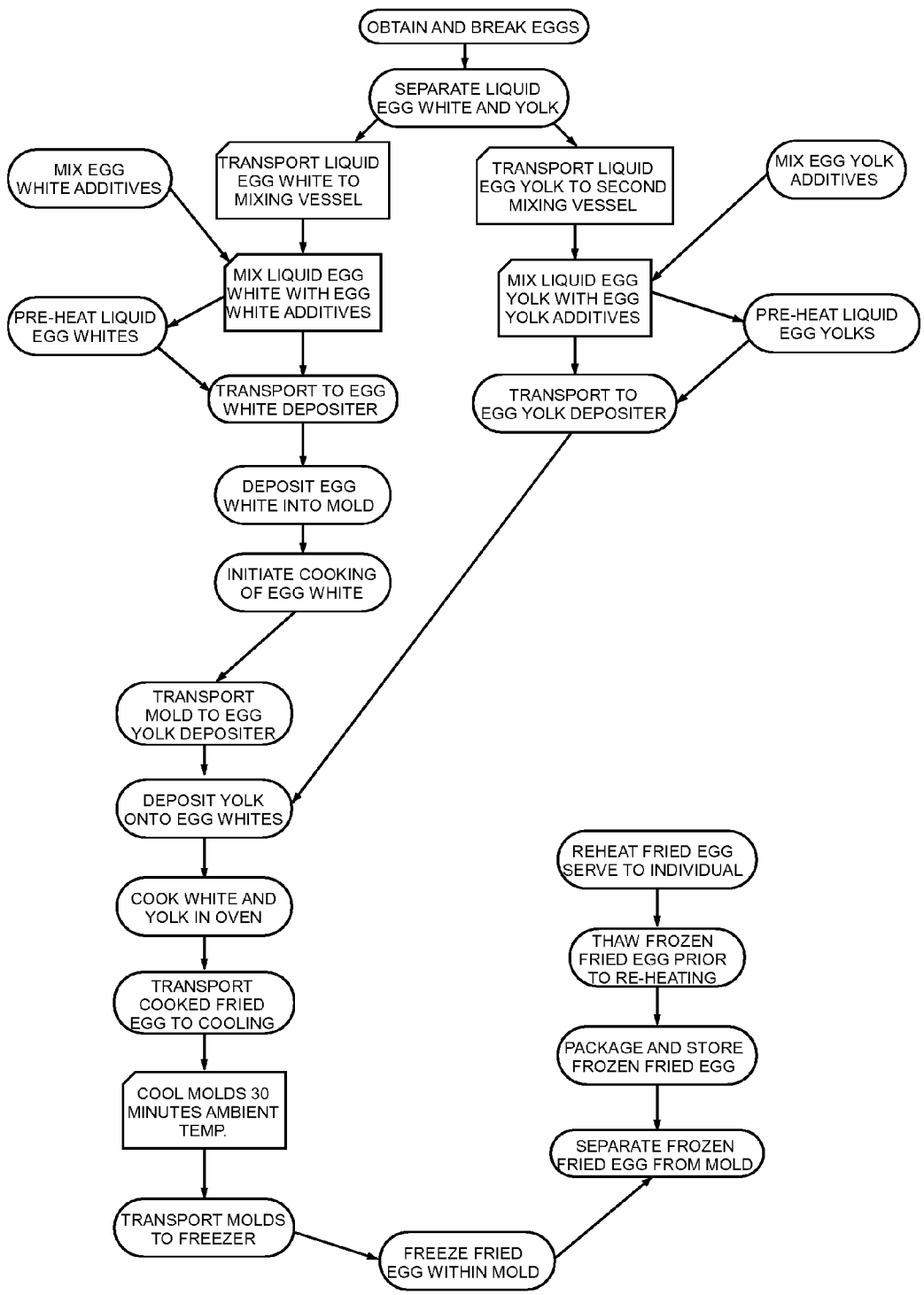
FIG. 2 shows is a block diagram showing the processing steps during the formation of the fried egg product.

In general, the disclosed invention relates to a formulated fried egg product, and a process to prepare the formulated fried egg product. The formulated fried egg product is generally formed of an egg white portion and an egg yolk portion.

The formulated fried egg product following cooking is preferably frozen, thawed, and heated prior to consumption by an individual and/or prior to incorporation into a composite food product.

The disclosed formulation for the fried egg product, and process to prepare the formulated fried egg product, originates with liquid egg whites and liquid egg yolks which, when cooked, and combined with other ingredients, may be frozen and/or refrigerated for reheating within microwave ovens, convection ovens, griddles or any other type of heating device without limitation, for consumption as an individual or combination component for a consumable food product. The formulated fried egg article may include a wide range of egg product and ingredient formulations, which when mixed, frozen and/or refrigerated, followed by reheating result in a visually and sensory appealing formulated fried egg.

The process for forming the fried egg product for future reheating within a microwave or other heating oven or griddle is distinctly different in certain physical characteristics as related to standard processing techniques.

Ordinarily one would not expect the control of ingredients, the regulation of temperature, the control of cooking conditions, and the management of mixing parameters during food processing to yield an enhanced formulated fried egg product. The failure to control ingredient proportions, regulate the temperature of the ingredients, the conditions of cooking, and/or the management of mixing parameters significantly degrades the integrity of sensory and taste perceptions for the fried egg product. Control of ingredient proportions, regulation of the temperature for the ingredients, limitations upon cooking conditions, and management of mixing parameters provides enhanced consistency and integrity for the formulated fried egg product and reduces sogginess, enhancing the likelihood that the formulated fried egg will remain intact through processing, freezing or refrigeration, and subsequent reheating prior to consumption by an individual. The control of ingredient proportions, regulation of ingredient temperature, limitation of cooking conditions, and management of mixing parameters also maximizes the retention of a cohesive texture and sensory perceptions associated with a composite formulated fried egg product.

The formulations and food processing techniques described herein minimize undesirable effects of the fried egg being rubbery, or exhibiting syneresis or loss of water when frozen, reheated, or when stored for an extended duration of time.

The formulations and food process techniques described herein further minimize waste of the consumable formulated fried egg.

The present methodology for formulation of the fried egg product occurs through the acquisition of farm packaged, ungraded, washed, fresh eggs, where the egg whites have been separated from the egg yolks by hand or mechanical egg shelling techniques. Care should be utilized to avoid overgassing of the egg white component of the formulated fried egg during exposure to mechanical egg shelling and separation techniques. The liquid egg white and/or liquid egg yolk portions of the formulated fried egg may be obtained from shell eggs and/or pasteurized shell eggs. It is desirable for the liquid egg yolk portion of the formulated fried egg to be semi-solid following cooking and reheating after being frozen. Dried egg white powder and/or egg yolk powder may be added to the liquid egg yolk portion to improve the density, texture, and mouth feel for the egg yolk portion of the formulated fried egg.

The liquid egg whites as separated from the liquid egg yolks form the starting materials for the formulated fried egg product. In general, the liquid egg whites may be uncooked or pasteurized for use as the starting material.

First, the starting liquid egg whites are maintained in a suitable container and may be refrigerated for later mixing with supplements to provide a superior taste, appearance and texture for the formulated fried egg. Preferably, the liquid egg whites are not stored as refrigerated but are immediately used for processing into the formulated fried egg.

The formulated fried egg product preferably has the physical and chemical characteristics of a natural fried egg and is sensorily acceptable as a formulated fried egg product in substitution for a standard natural fried egg.

In general, the process for formulation of the fried egg includes: obtaining a desired amount or volume of unshelled liquid egg yolks, and liquid egg whites and placing the unshelled liquid eggs into separate mixing tanks or vessels. In a third and forth separate tank, "dry ingredients" including, but not necessarily limited to, oils; gums and modified food starches; non-fat dry milk; salt; water and citric acid may be placed. The "dry ingredients" are then preferably separately mixed. The mixed "dry ingredients" may then be introduced into the respective vessel containing liquid egg whites and/or liquid egg yolks whereupon mixing should occur. Alternatively, the applicable "dry ingredients" may be directly mixed within the individual vessels containing the liquid egg whites and/or the liquid egg yolks.

Mixing may occur through the use of an Admix High Shear Mixer for a desired period of time which may be five minutes at a speed of 3450 rotations per minute resulting in a homogeneous liquid egg white and/or egg yolk product. Mixing may result in the formation of a foam which is preferably removed from the liquid egg white and/or liquid egg yolk mixture.

Alternatively, the ingredients for the liquid egg whites and liquid egg yolks may be mixed for approximately 5 to 10 minutes and then the mixed liquid egg whites and liquid egg yolks may be pumped through commercial processing equipment for deposit into a mold for cooking in a commercial convection oven. Alternatively, the liquid egg whites and/or liquid egg yolks may be mixed through constant stirring for a desired period of time whereupon the mixed liquid egg whites and liquid egg yolks may be pumped into the depositor for further processing. Alternatively, the mixed liquid egg whites and/or liquid egg yolks may be homogenized through commercially available homogenizing equipment. It is also generally desirable to avoid excessive mixing or agitation of the liquid egg whites and/or liquid egg yolks which may result from the use of powerful mixing equipment. Excessive mixing causes aeration within the liquid egg product resulting in the formation of air bubbles during cooking of the formulated fried egg. Excessive agitation may further cause the degradation of the egg whites and/or egg yolks adversely affecting the quality of the formulated fried egg product.

The ingredients of the liquid egg white and/or liquid egg yolk may be mixed within a Kramer & Grebe multi-mix mixer. Alternatively, the liquid egg whites and/or liquid egg yolks may be mixed within a Hobart blender. The mixed liquid egg whites may be placed within individual molds by a Koppens dispensing machine which may regulate the desired volume of the mixed liquid egg whites within each individual mold.

The mixed liquid egg whites may then be pumped for preheating within a heat exchanger. The mixed liquid egg yolks may also be pumped for preheating within a second heat exchanger. The preheated liquid egg white product may then be pumped into a depositor. The preheated liquid egg yolk product may then be pumped into a second depositor. Finally, the preheated liquid egg whites are deposited in a mold for cooking. Following an initial period of cooking the egg yolk portion is deposited upon the partially cooked egg white portion within the mold. Further cooking of the egg white and egg yolk portions normally follows by passing of the molds containing the preheated liquid egg whites and yolks through a convection oven. The cooked fried eggs are then cooled, frozen, and removed from the molds for appropriate storage and/or for reheating and inclusion within a food product such as breakfast sandwich.

Alternatively, the process for formulation of a fried egg product may include obtaining a desired amount or volume of unshelled liquid egg whites, and egg yolks. Placing the unshelled liquid egg whites and yolks into separate mixing tanks for mixing with initial ingredients such as oils, gums, modified food starches, salt, and water. Next the liquid egg whites and liquid yolks may be pumped to a heat exchanger for preheating. Next, the mixed liquid egg whites and yolks may be pumped to a respective depositor, whereupon a desired amount of preheated liquid egg whites are deposited within molds. The mold then passes a second depositor containing the liquid egg yolks for depositing of the liquid egg yolk portion into the mold on top of the uncooked liquid egg white portion. The molds containing the liquid egg whites and yolks are then passed into an oven for cooking. The cooked formulated fried eggs are then cooled, frozen, and removed from the molds for appropriate storage and/or for inclusion within a food product.

Initial homogenizing of the liquid egg whites and/or yolks may occur provided that the homogenizing methods utilized do not significantly delay the continued cooking of the mixed liquid egg whites and/or liquid egg yolks. Preferably, the mixed liquid egg whites and liquid egg yolks are cooked within a few hours of mixing and more preferably cooking occurs immediately following the mixing of the liquid egg whites and liquid egg yolks.

Citric acid and/or citric acid in combination with xanthan gum may be added to the liquid egg yolk. The citric acid slows the iron sulfide generating reaction during cooking and improves the appearance of the egg yolk while simultaneously increasing the viscosity of the egg yolk at lower cooking temperatures.

It is desirable for the egg white portion following cooking to be elastic, smooth, have a cohesive texture, be tender and fracture providing the appearance of a natural egg white portion of a fried egg. To achieve egg white consistency, minimization of air bubbles is required which reduces cupping, graininess, and freezer/thaw degradation. In order to assist in the improvement of the consistency and texture of the egg white portion, polar gel modified food starch and/or purity modified food starch may be added. Polar gel starch in most applications provides slightly better texture and consistency for the cooked egg white portion of the formulated fried egg. The use of polar gel starch at a level of approximately 1.5% also provides adequate freezer/thaw protection for the formulated fried egg. In addition, the texture and/or appearance of the egg white portion or yolk portions may be influenced by the type of gum which is added to the formulated fried egg. To improve texture and/or appearance, guar and/or xanthan gum provide acceptable results upon cooking of the formulated fried egg. The texture and/or appearance of the formulated fried egg following cooking is improved through the addition of a combination of modified food starch and gum. The use of excessive modified food starch should be avoided to minimize perceived rubberiness and undesirable mouth feel for the formulated fried egg. The use of xanthan gum also improves the mouth feel characteristics for the formulated fried egg following cooking.

In order to minimize undesirable bubbling particularly within the egg white portion a procedure may be implemented to degas and to remove air bubbles from the liquid egg whites. A vacuum treatment may be introduced for a period of approximately two hours in order to attempt to draw air bubbles to the surface of the liquid egg whites. Air bubbles may float to the surface of the liquid egg whites following depressurizing of the container holding the liquid egg whites. Initially, commercial processed broken out egg whites are more susceptible or disposed to bubble formation than hand broken eggs. Separation of the egg whites from the hand broken eggs generally yields intact egg magma minimizing undesirable air bubble formation.

The pH of the liquid egg white portion is normally between 8.2 to 8.5. An increase in the pH of the liquid egg white portion to a level between 8.8 and 9.1 decreases the volume of air bubbles and reduces the cupping of the egg white portion during cooking. Further, an increase of the pH to approximately 9 for the liquid egg white portion results in greater freezer/thaw protection reducing damage to the formulated fried egg following cooking and subsequent freezing.

The use of 1.0 ml. of 1.0 normal NaOH (40 g/960 ml. water) at approximately 1.0 ML. NaOH solution to 100 ml. of liquid egg whites increases the pH from approximately 8.4 to 8.8. The greatest effect of bubble and cupping reduction for the liquid egg whites occurs when the pH is approximately 9.0 accompanied by a low percentage of modified food starch and xanthan gum.

In general, the ingredients for the egg white portion and the egg yolk. portion are not required to be combined in any preferred order for mixing. The ingredients of the egg white portion and the egg yolk portion are preferably mixed cold at a temperature between 32° F. and 40° F., 0° C. and 4.44° C. and more preferably less than 40° F., 4.44° C. Water may be added to the "dry ingredients" to facilitate mixing. The "dry ingredients" and water may then be mixed into the respective liquid egg whites and/or liquid egg yolks to formulate the individual core components for the formulated fried egg product. The mixing time for the respective egg whites and/or egg yolk portions is reduced to a minimum and generally is no longer than necessary to insure adequate mixing. The mixing may occur through the use of a high shear mixer as is commercially available.

Following the completion of mixing of the liquid egg whites and/or liquid egg yolks, a preheating step may occur prior to the cooking of the fried egg product. In operation, the preheating phase is generally continuous for the enhanced mixed liquid egg whites and liquid egg yolks. Preheating occurs as the liquid egg white mixture and liquid egg yolk mixture is pumped through a respective set of equipment for introduction to a tube to tube heat exchanger for each mixture. The temperature of the enhanced liquid egg white mixture and liquid egg yolk mixture prior to the respective tube to tube heat exchanger is approximately 40° F., 4.44° C.

The temperature of the enhanced mixture of liquid egg whites and liquid egg yolks exiting the respective tube to tube heat exchanger and/or a respective scraped surface heat exchanger following completion of preheating is approximately 135° F., 57.22° C. The preheating phase elevates the temperature of the enhanced liquid egg white mixture and liquid egg yolk mixture prior to the introduction of the liquid egg white mixture and/or liquid egg yolk mixture into a respective depositor. The preheating of the mixed liquid egg whites and mixed liquid egg yolks may occur within individual tube to tube heat exchangers identified as a Feldmeier systems.

In addition, the preheating procedure may continue through the use of scraped surface heat exchangers which may be identified as Contherm Swept Surface Heat Exchangers. It should also be noted that the preheating may be eliminated and/or significantly reduced so long as cooking times and temperatures are correspondingly adjusted for cooking of the enhanced formulated fried egg at a sufficiently low temperature and for a sufficiently short duration of time to avoid burning, sticking, and/or other undesirable complications associated with the cooking process. Undesirable complications include, but are not necessarily limited to, excessive bubbling where the starting liquid egg whites and/or liquid egg yolks have not been previously preheated. The formation of an undesirable skin for the fried egg and the undesirable hardening of the egg yolk portion, undesirable skin formation usually occurs when the formulated fried egg is exposed to excessive temperature and/or cooking time.

During and/or immediately following preheating, the mixed liquid egg whites are preferably pumped and/or passed through the depositor for the delivery of a specific weight or volume of mixed liquid egg whites into a mold at a set rate. The speed or rate of the depositor may be adjusted dependent upon the temperature of the oven and cooking time exposed to the formulated fried egg. The speed of the depositor is the rate at which a mold is filled with mixed liquid egg white for movement through an oven. The molds filled with the liquid egg whites may then be passed through a second depositor which contains the preheated liquid egg yolks. The second depositor then deposits a desired volume of preheated liquid egg yolk material upon the previously dispensed egg whites. The placement of the egg yolk material onto the egg whites is not standardized or uniform which therefore enhances the natural appearance for the formulated fried egg product. Following the deposit of the preheated liquid egg yolk material into the previously partially filled mold containing the egg whites, the mold may be transported to an oven for cooking.

During formation of the formulated fried egg following preheating of the egg white portion, deposit of the egg white portion within the mold, and/or the initiation of the cooking of the egg white portion, the liquid egg yolk portion is heated to a temperature just below the coagulation point for the liquid egg yolk. The heated egg yolk is then deposited into the mold upon the preheated egg white portion. The position of the egg yolk portion upon the egg white portion is generally not symmetrical and/or uniform between individual portions of the formulated fried egg. The mold containing the egg yolk and egg white portions is then cooked increasing the viscosity of the egg white and egg yolk portions.

A conveyor and/or an extractor device preferably inserts an empty mold and retrieves a filled mold from the Koppens dispenser. The conveyor preferably transports molds filled with liquid egg white material to a second depositor or dispensing machine for receipt of a portion of liquid egg yolk material. The conveyor continues to transport the molds containing the liquid egg white and liquid yolk material into a convection oven for heating.

The conveyor also preferably transports individual cooked formulated fried eggs to a freezing and package stage where one or more of the individual formulated fried eggs may be packaged together.

The humidity of the oven is an important factor during cooking of the formulated fried egg. Increased humidity within the oven enhances the sensory perceptions such as appearance, taste, and mouth feel for the cooked formulated fried egg. Cooking of the formulated fried egg product therefore occurs at a high moisture atmosphere at an approximate temperature of 350° F. or 176.67° C. A gas fired steam injection cooker as available from Hobart is adequate for the cooking purposes. In addition, in order to obtain a desired high moisture atmosphere, the exhaust dampers for the oven may be required to be closed. Closing of the oven dampers may necessarily increase the temperature within the ovens by approximately 25° F. or 3.89° C. or more. It is anticipated that the minimum temperature of the oven is required to exceed 165° F. or 73.89° C. The oven is preferably completely preheated in order to attempt to obtain an equalibration of the cooking components.

The conditions of the oven during the initial cooking of the formulated fried egg, and the condition of the oven during reheating of the formulated fried egg following freezing, has a large impact upon skin formation and egg texture. To minimize undesirable skin formation and to maximize the texture, taste, mouth feel, and other sensory perceptions, the formulated fried egg should be cooked slowly at relatively low temperatures. In addition, humidity with the oven should be maximized. The speed of cooking of the formulated fried egg significantly impacts the final textural properties as perceived by consumers. Cooking of the formulated fried egg to rapidly and at an increased temperature causes air bubbles to form which interrupt the egg structure and particularly the egg white structure destroying the smooth cohesive texture for the formulated fried egg.

The oven conditions during cooking may vary. Generally, cooking of the formulated fried egg at may occur a temperature of 325° F. or 162.78° C. at a full steam setting where the cooking time is 7.75 minutes. These cooking conditions provide an acceptable cooked formulated fried egg.

Alternatively, cooking of the formulated fried egg may occur at a temperature of 375° F. or 190.56° C. at full steam for 6.5 minutes to yield an acceptable cooked formulated fried egg.

In another embodiment, cooking of the formulated fried egg may occur at a temperature of approximately 375° F. or 190.56° C. for 6.5 minutes where full steam is provided for the final one-third of the cooking time to yield an acceptable cooked formulated fried egg.

In yet another embodiment, cooking of the formulated fried egg may occur at a temperature of approximately 425° F. or 218.33° C. for 5.5 minutes where full steam is provided during the entire cooking duration to yield an acceptable cooked formulated fried egg.

A proctor oven may be utilized to cook for the formulated fried egg. Alternatively, a batch oven may be utilized to cook the formulated fried egg. The cooking times for the formulated fried egg are normally between 6.5 and 8 minutes. In addition, it is preferable to lower the cooking temperature and to increase the pH within the formulated fried egg to maximize quality. A cooking time of 6.5 to 8 minutes has been found to be adequate for coagulation of the egg proteins for the formulated fried egg.

In order to minimize skin formation during cooking molds containing individual egg receiving areas are used. The molds containing the formulated egg prior to and during cooking are not required to be treated with oil and/or water. When no treatment is applied to the molds during cooking at relatively high temperatures, the firmness of the top layer of the egg is reduced. In addition, the cooking of the formulated fried egg without the use of oil, water, and/or other treatment may result in the undesirable dehydration and crusting of the egg surface and particularly the egg white surface.

During cooking of the formulated fried egg within the molds, edible oil may be sprayed upon the top surface of the egg to deter dehydration and crusting of the egg surface. The effectiveness of the sprayed oil upon the surface of the egg is improved when the formulated fried egg is cooked at lower temperatures of approximately 325° F. or 162.78° C.

Alternatively, water may be sprayed upon the top surface of the formulated fried egg as within the molds during cooking to deter dehydration and crusting of the egg surface. The use of water as sprayed upon the surface of the formulated fried egg yields the shiniest and most natural appearing fried egg.

In general, a continuous forced draft convection heating oven is utilized for cooking of the formulated fried egg. A suitable forced draft convection heating oven is preferably identified as a Wolverine Proctor Convection Oven. The operational oven temperature parameters are usually identified as 325° F. to 475° F. or 162.78° C. to 246.11° C. where the dampers and relative humidity within the convection oven may be adjusted dependent upon the local environmental conditions as identified within the examples indicated herein.

During cooking, each mold may be covered with foil to minimize dehydration and crusting of the fried egg surface. Cooking of the formulated fried eggs within the molds as covered by aluminum foil usually occurs at lower cooking temperatures of approximately 325° F. or 162.78° C. Prior to cooking of the molds as covered with aluminum foil and/or plastic material, water may be added to each egg receiving area to minimize dehydration and/or crusting of the surface of the formulated fried egg during cooking. The inclusion of water within the egg receiving area of the molds prior to covering with foil and/or plastic improves the humidity of the formulated fried egg during cooking thereby reducing undesirable skin formation, dehydration, and/or crusting of the surface of the fried egg.

The molds utilized to cook the formulated fried egg may identified as proctor oven molds where each egg receiving area has a diameter of between 3 in. to 3.5 in. or 7.62 cm. to 8.89 cm. Each mold may include one row of 3 egg receiving areas. Alternatively, a mold may include any desired number of rows of egg receiving areas. In addition, the interior of the egg receiving areas of each mold may be treated with silicon and/or Teflon® to reduce the undesirable sticking of the cooked formulated fried egg within the mold. Each egg receiving area of each mold is preferably constructed and arranged to hold between 14-8 grams of egg yolk material as deposited on 18-24 grams of egg white material.

A mold 10 having individual food receiving openings 12 may be inserted proximate to the dispensing device 26 where each individual food opening 12 receives approximately 3 ounces or 86.05 grams of consumable food product.

The mold as utilized herein is preferably substantially circular in shape and has a sufficient depth to hold for cooking the mixed liquid egg whites and subsequent deposited mixed liquid egg yolk material.

Referring to FIG. 1, the mold may be formed of metal, Teflon®, and/or any other desired material for use in the processing, cooling, and/or freezing, of the formulated fried egg. The material selected for the mold 10, is required to be amenable to repeated cleansing to minimize food related health issues and/or contamination. Each individual mold is generally adapted to receive 3 ounces or 85.05 grams of mixed liquid egg white material and 3 ounces or 85.05 grams of mixed liquid egg yolk material for cooking into the formulated fried egg product.

Following cooking, the molds containing the cooked formulated fried eggs may be removed from the oven and permitted to cool at room temperature for approximately 30 minutes. A cross cup conveyor may then be used to transfer the molds to a freezing unit to implement freezing of the molds containing the formulated fried eggs.

The molds containing the cooked formulated fried eggs may be frozen in any manner as desired including, but not necessarily limited to, freezing upon exposure to carbon dioxide snow; cryogenic freezing through the use of liquid nitrogen within a Spyro freezer; and/or freezing through convention freezing techniques. If a cryogenic freezing technique is utilized then the Spyro freezer and associated conveyor may be set to freeze approximately 3800 units of formulated fried egg per hour. Freezing of the cooked molds holding the cooked formulated fried eggs may also occur through the use of a carbon dioxide freezing tunnel having a centrally disposed conveyor for transportation of the cooked molds of formulated fried eggs. Alternatively, liquid nitrogen may be used as the freezing medium which may be either sprayed upon or exposed to the molds through conventional processing techniques. The use of liquid nitrogen is anticipated to be sufficient to freeze 3000 lbs. of cooked formulated fried eggs per hour.

Following cooking, the formulated fried eggs may be individually quick frozen. Individual quick freezing of the eggs should occur in a short duration of time.

Generally as the time required for freezing ingredients decreases the quality of the frozen article after thawing increases. A Spyro freezer may be utilized to individually quick freeze the formulated fried egg product. The throughput for the freezer may establish a freezing time of approximately 30 minutes. The formulated fried egg product may be exposed to a temperature below $-10°$ F., $-23.33°$ C. and not to exceed $20°$ F., $-6.67°$ C. Individual quick freezing of the cooked formulated fried egg product provides safety advantages minimizing food related health and/or contamination issues. Following the individual quick freezing of the cooked formulated fried egg product, the fried eggs may endure being frozen, refrigerated, and/or being kept hot following reheating for extended durations of time without the sacrifice of product quality.

The frozen formulated fried eggs may then be separated from the molds by conventional separation techniques which may include the use of vacuum assisted separation devices. Following separation from the molds, the frozen formulated fried eggs may be individually packaged and/or packaged in bulk for storage. The frozen formulated fried eggs may additionally be vacuum packaged and/or gaseous nitrogen may be utilized to flush air from the packages to minimize risk of contamination and/or freezer or thaw damage to the formulated fried eggs during storage.

Alternatively, the food separation device may include grasping arms and/or positioners to facilitate the separation of the cooked and frozen formulated fried egg from the interior of the respective mold. The food separation device may also include pneumatic and/or hydraulic pumps having hose conduits which in turn may be in communication with one or more individual suction extractors. One or more valves may be utilized to regulate the pneumatic and/or hydraulic pressure on the individual suction devices for use in separation of the frozen formulated fried egg from an individual mold. The pumps and valves may regulate the pressure to be exposed to the individual extraction devices to downwardly force the individual extraction devices into the respective mold for separation of the frozen formulated fried egg product from the mold.

A conveyor may be placed below the food separation device. The conveyor is preferably adapted to receive, carry, and/or transport frozen formulated fried eggs following separation from an individual mold for packaging.

Prior to reheating of the frozen formulated fried eggs, thawing is generally required. Following the thawing of the previously frozen formulated fried eggs, the eggs may be reheated within a conventional oven or microwave oven prior to consumption by an individual. The thawed formulated fried eggs are generally required to be covered or enclosed within a medium such as plastic to minimize dehydration, the formation of undesirable skin, and/or crusting of the surface of the fried egg during reheating. In addition, the power setting for a microwave oven should be reduced to minimize undesirable skin formation. Reheating through the use of a conventional oven generally also requires that the formulated fried eggs be covered to minimize undesirable skin formation, dehydration, and/or crusting of the surface of the eggs. Alternatively, humidity may be increased within the oven as earlier described to maximize the quality of the reheated formulated fried eggs. Alternatively, steam injection cooking may be utilized to reheat a thawed formulated fried egg which may eliminate the necessity for covering of the eggs or cooking wells containing the thawed formulated fried eggs during reheating.

Various ingredients are utilized to provide a desired quality for a composite formulated fried egg. Generally, the ingredients to be incorporated into the formulated fried egg include: egg yolk; xanthan gum; salt; corn syrup solids; citric acid; carrageenan; annatto; whole egg; hard cooked yolk; water; propylene glycol; egg whites; soy bean oil; modified food starch; ProMix (non-fat dry milk and whey solids); polar gel modified food starch; SLS; delight modified food starch; guar gum; white pepper; and natural egg flavor. Further, the formulated fried egg product may include water, soy bean oil, corn oil, citric acid, and/or butter flavor. The ingredients described herein have been provided for illustrative purposes only and the group of ingredients identified herein may comprise any number of additional items identified in this description or which have not been previously identified.

Egg whites generally comprise between 50% and 99.5% of the total percent weight of the entire egg white portion of the formulated fried egg product. Water is generally provided in an amount between 0% and 10% of the total weight of the egg white portion. Soy bean oil and/or corn oil is usually provided between 0% and 10% as based upon the percentage of total weight for the egg white portion. Modified food starch is generally provided between 0% to 3% of the total weight of the egg white portion. ProMix or non-fat dried milk and whey solids generally provide between 0% to 3% of the total weight of the egg white portion. Salt is generally provided between 0% to 1% of the total weight of the egg white portion. Xanthan gum is generally provided between 0% to 0.4% of the total weight of the egg white portion. Polar gel is generally provided between 0% to 3% of the total weight of the egg white portion. Citric acid is generally provided between 0% to 0.2% of the total weight of the egg white portion. SLS is generally provided between 0% to 0.4% of the total weight of the egg white portion. Delight modified food starch is generally provided between 0% to 2.5% of the total weight of the egg white portion. Guar gum generally forms between 0% to 0.3% of the total weight of the egg white portion. Propylene glycol is generally provided between 0% and 0.3% of the total weight of the egg white portion. White pepper generally forms between 0% to 0.05% of the total weight of the egg white portion. Natural egg flavor also generally provides between 0% and 0.1% of the total weight of the egg white portion.

The egg yolk portion generally has egg yolks in the percentage amount between 50% to 99.9% of the total weight of the egg yolk portion of the formulated fried egg product. Xanthan gum is generally provided between 0% to 0.5% of the total weight of the egg yolk portion. Salt is generally provided between 0% to 0.4% of the total weight of the egg yolk portion. Citric acid is generally provided between 0% to 0.15% of the total weight of the egg yolk portion. Carrageenan generally forms between 0% to 0.3% of the total weight of the egg yolk portion. Whole egg is generally provided between 0% to 0.50% of the total weight of the egg yolk portion. Hard cooked egg yolk is generally provided between 0% to 0.45% of the total weight of the egg yolk portion. Water is generally provided between 0% to 15% of the total weight of the egg yolk portion. Propylene glycol is generally provided between 0% to 0.1% of the total weight of the egg yolk portion and egg whites are generally provided between 0% to 20% of the total weight of the egg yolk portion.

A typical formula for the egg white portion utilized within the formulated fried egg product would involve the use of egg whites constituting 81% of the total weight of the egg white portion of the fried egg product; water comprising 10% of the total weight of the egg white portion of the fried egg product; soy bean oil/corn oil constituting 4% of the total weight of the egg white portion of the fried, egg product; modified food starch being 2.5% of the total weight of the egg white portion of the fried egg product; ProMix 632 (non-fat dry milk and whey solids) where the ProMix 632 constitutes 2% of the total weight of the egg white portion of the fried egg product; salt in the amount 0.35% of the total weight of the egg white portion of the fried egg product; and xanthan gum in the amount of 0.15% of the total weight of egg white portion of the fried egg product.

An alternative formula the egg white portion would include egg whites being 85.9% of the total weight of the egg white portion of the fried egg product; water being 7.15% of the total weight of the egg white portion of the fried egg product; soy bean oil being 4% of the total weight of the egg white portion of the fried egg product; modified food starch being 2.5% of the total weight of the egg white portion of the fried egg product; salt being 0.35% of the total weight of the egg white portion of the fried egg product; citric acid being 0.1% of the total weight of the egg white portion of the fried egg product.

Another alternative formula the egg white portion would include egg whites in the amount of 93.15% of the total weight of the egg white portion of the fried egg product; soy bean oil in the amount of 4% of the total weight of the egg white portion of the fried egg product; modified food starch in the amount of 2.5% of the total weight of the egg white portion of the fried egg product; and salt in the amount of 0.35% of the total weight of the egg white portion of the fried egg product.

In still another formula the egg white portion would include the use of egg whites in the amount of 97.15% of the total weight of the egg white portion of the fried egg product; modified food starch in the amount of 2.5% of the total weight of the egg white portion of the fried egg product; and salt in the amount of 0.35% of the total weight of the egg white portion of the formulated fried egg product.

In another alternative formula the egg white portion would include the use of the egg white which would constitute 86% of the total weight of the egg white portion of the formulated fried egg product; water would be 7.15% of the total weight of the egg white portion of the formulated fried egg product; soy bean oil would form 4% of the total weight of the egg white portion of the formulated fried egg product; modified food starch would form 2.5% of the total weight of the egg white portion of the formulated fried egg product; and salt would be 0.35% of the total weight of the egg white portion of the formulated fried egg product.

In another alternative formula the egg white portion would include the egg whites forming 93.15% of the total weight of the egg white portion of the formulated fried egg product; soy bean oil would constitute 4% of the total weight of the egg white portion of the formulated fried egg product; modified food starch would constitute 2.5% of the total weight of the egg white portion of the formulated fried egg product; and salt would constitute 0.35% of the total weight of the egg white portion of the formulated fried egg product.

In an alternative formula the egg white portion would include egg whites forming 91.65% of the total weight of the egg white portion of the formulated fried egg product; soy bean oil would constitute 6% of the total weight of the egg white portion of the formulated fried egg product; polar gel would constitute 2% of the total weight of the egg white portion of the formulated fried egg product; salt would constitute 0.35% of the total weight of the egg white portion of the formulated fried egg product; and xanthan gum would constitute 0.3% of the total weight of the egg white portion of the formulated fried egg product.

In another alternative formula the egg white portion would include egg whites forming 83% of the total weight of the egg white portion of the formulated fried egg product; water would constitute 10% of the total weight of the egg white portion of the fried egg product; soy bean oil would constitute 4% of the total weight of the egg white portion of the formulated fried egg product; modified food starch would constitute 2.5% of the total weight of the egg white portion of the formulated fried egg product; xanthan gum would constitute 0.15% of the total weight of the egg white portion of the formulated fried egg product; and salt would constitute 0.35% of the total weight of the egg white portion for the formulated fried egg product.

In another alternative formula the egg white portion would include egg whites forming 85.65% of the total weight of the egg white portion of the formulated fried egg product; soy bean oil would constitute 5% of the total weight of the egg white portion of the formulated fried egg product; water would constitute 7% of the total weight of the egg white portion of the formulated fried egg product; modified food starch would constitute 2% of the total weight of the egg white portion of the formulated fried egg product; and salt would constitute 0.35% of the total weight of the egg white portion of the formulated fried egg product.

In yet another formula the egg white portion would include egg whites forming 86% of the total weight of the egg white portion of the formulated fried egg product; water would constitute 7.15% of the total weight of the egg white portion of the formulated fried egg product; soy bean oil would constitute 4% of the total weight of the egg white portion of the formulated fried egg product; modified food starch would constitute 2.5% of the egg white portion of the formulated fried egg product; and salt would constitute 0.35% of the egg white portion of the formulated fried egg product.

In yet another alternative formula the egg white portion would include egg whites forming 89.1% of the total weight of the egg white portion of the formulated fried egg product; soy bean oil would constitute 8% of the total weight of the egg white portion of the formulated fried egg product; polar gel would constitute 2.5% of the total weight of the egg white portion of the formulated fried egg product; and salt would constitute 0.4% of the total weight of the egg white portion of the formulated fried egg product.

In yet another alternative formula the egg white portion would include egg whites forming 91.1% of the total weight of the egg white portion of the formulated fried egg product; soy bean oil would constitute 6% of the total weight of the egg white portion of the formulated fried egg product; polar gel would constitute 2.5% of the total weight of the egg white portion of the formulated fried egg product; and salt would constitute 0.4% of the total weight of the egg white portion of the formulated fried egg product.

In yet another alternative formula the egg white portion would include egg whites forming 92.45% of the total weight of the egg white portion of the formulated fried egg product; soy bean oil would constitute 6% of the total weight of the egg white portion of the formulated fried egg product; polar gel would constitute 1% of the total weight of the egg white portion of the formulated fried egg product; salt would constitute 0.4% of the total weight of the egg white portion of the formulated fried egg product; and xanthan gum would constitute 0.15% of the total weight of the egg white portion of the formulated fried egg product.

In yet another alternative formula the egg white portion would include egg whites forming 99.25% of the total weight of the egg white portion of the formulated fried egg product; polar gel would constitute 0.5% of the total weight of the egg white portion of the formulated fried egg product; and xanthan gum would constitute 0.25% of the total weight of the egg white portion of the formulated fried egg product.

In yet another alternative formula the egg white portion would include egg whites forming 98.88% of the total weight of the egg white portion of the formulated fried egg product; polar gel would constitute 1% of the total weight of the egg white portion of the formulated fried egg product; and xanthan gum would constitute 0.13% of the total weight of the egg white portion of the formulated fried egg product.

In yet another alternative formula the egg white portion would include egg whites forming 87.1% of the total weight of the egg white portion of the formulated fried egg product; soy bean oil would constitute 10% of the total weight of the egg white portion of the formulated fried egg product; polar gel would constitute 2.5% of the total weight of the egg white portion of the formulated fried egg product; and salt would constitute 0.4% of the total weight of the egg white portion of the formulated fried egg product.

In yet another alternative formula the egg white portion would include egg whites forming 90.55% of the total weight of the egg white portion of the formulated fried egg product; soy bean oil would constitute 8% of the total weight of the egg white portion of the formulated fried egg product; polar gel would constitute 1% of the total weight of the egg white portion of the formulated fried egg product; salt would constitute 0.4% of the total weight of the egg white portion of the formulated fried egg product; and xanthan gum would constitute 0.05% of the total weight of the egg white portion of the formulated fried egg product.

In yet another alternative formula the egg white portion would include egg whites forming 89.1% of the total weight of the egg white portion of the formulated fried egg product; soy bean oil would constitute 9% of the total weight of the egg white portion of the formulated fried egg product; polar gel would constitute 1.5% of the total weight of the egg white portion of the formulated fried egg product; and salt would constitute 0.4% of the total weight of the egg white portion for the formulated fried egg product.

In yet another alternative formula the egg white portion would include egg whites forming 90.05% of the total weight of the egg white portion of the formulated fried egg product; soy bean oil would constitute 8% of the total weight of the egg white portion of the formulated fried egg product; polar gel would constitute 1.5% of the total weight of the egg white portion of the formulated fried egg product; salt would constitute 0.4% of the total weight of the egg white portion of the formulated fried egg product; and xanthan gum would constitute 0.05% of the total weight of the egg white portion of the formulated fried egg product.

In yet another alternative formula the egg white portion would include egg whites forming 91.6% of the total weight of the egg white portion of the formulated fried egg product; soy bean oil would constitute 8% of the total weight of the egg white portion of the formulated fried egg product; and salt would constitute 0.4% of the total weight of the egg white portion of the formulated fried egg product.

In yet another alternative formula the egg white portion would include egg whites forming 99% of the total weight of the egg white portion of the formulated fried egg product; and SDS would constitute 1% of the total weight of the egg white portion of the formulated fried egg product.

In yet another alternative formula the egg white portion would include egg whites forming 99.5% of the total weight of the egg white portion of the formulated fried egg product; and SDS would constitute 0.5% of the total weight of the egg white portion of the formulated fried egg product.

In yet another alternative formula the egg white portion would include egg whites forming 99.9% of the total weight of the egg white portion of the formulated fried egg product; and SDS would constitute 0.1% of the total weight of the egg white portion of the formulated fried egg product.

In yet another alternative formula the egg white portion would include egg whites forming 94.25% of the total weight of the egg white portion of the formulated fried egg product; soy bean oil would constitute 4% of the total weight of the egg white portion of the formulated fried egg product; polar gel would constitute 1.25% of the total weight of the egg white portion of the formulated fried egg product; salt would constitute 0.4% of the total weight of the egg white portion of the formulated fried egg product; and SLS would constitute 0.1% of the total weight of egg white portion of the formulated fried egg product.

In yet another alternative formula the egg white portion would include egg whites forming 94.25% of the total weight of the egg white portion of the formulated fried egg product; soy bean oil would constitute 2% of the total weight of the egg white portion of the formulated fried egg product; delight modified food starch would constitute 2% of the total weight of the egg white portion of the formulated fried egg product; polar gel would constitute 1.25% of the total weight of the egg white portion of the formulated fried egg product; salt would constitute 0.4% of the total weight of the egg white portion of the formulated fried egg product; and SLS would constitute 0.1% of the total weight of the egg white portion of the formulated fried egg product.

In yet another alternative formula the egg white portion would include egg whites forming 93% of the total weight of the egg white portion of the formulated fried egg product; delight modified food starch would constitute 2% of the total weight of the egg white portion of the formulated fried egg product; soy bean oil would constitute 2% of the total weight of the egg white portion of the formulated fried egg product; polar gel would constitute 2.5% of the total weight of the egg white portion of the formulated fried egg product; salt would constitute 0.4% of the total weight of the egg white portion of the formulated fried egg product; and SLS would constitute 0.1% of the total weight of the egg white portion of the formulated fried egg product.

In yet another alternative formula the egg white portion would include egg whites forming 94% of the total weight of the egg white portion of the formulated fried egg product; delight modified food starch would constitute 2% of the total weight of the egg white portion of the formulated fried egg product; soy bean oil would constitute 2% of the total weight of the egg white portion of the formulated fried egg product; polar gel would constitute 1.25% of the total weight of the egg white portion of the formulated fried egg product; salt would constitute: 4% of the total weight of the egg white portion of the formulated fried egg product; and SLS would constitute 0.35% of the total weight of the egg white portion of the formulated fried egg product.

In yet another alternative formula the egg white portion would include egg whites forming 95.5% of the total weight of the egg white portion of the formulated fried egg product; delight modified food starch would constitute 2% of the total weight of the egg white portion of the formulated fried egg product; soy bean oil would constitute 2% of the total weight of the egg white portion of the formulated fried egg product; salt would constitute 0.4% of the total weight of the egg white portion of the formulated fried egg product; and SLS would constitute 0.1% of the total weight of the egg white portion of the formulated fried egg product.

In yet another alternative formula the egg white portion would include egg whites forming 94.25% of the total weight of the egg white portion of the formulated fried egg product; water would constitute 4% of the total weight of the egg white portion of the formulated fried egg product; polar gel would constitute 1.25% of the total weight of the egg white portion of the formulated fried egg product; salt would constitute 0.4% of the total weight of the egg white portion of the formulated fried egg product; and SLS would constitute 0.1% of the total weight of the egg white portion of the formulated fried egg product.

In yet another alternative formula the egg white portion would include egg whites forming 97.2% of the total weight of the egg white portion of the formulated fried egg product; polar gel would constitute 2.5% of the total weight of the egg white portion of the formulated fried egg product; xanthan gum would constitute 0.2% of the total weight of the egg white portion of the formulated fried egg product; and citric acid would constitute 0.1% of the total weight of the egg white portion of the formulated fried egg product.

In yet another alternative formula the egg white portion would include egg whites forming 93.84% of the total weight of the egg white portion of the formulated fried egg product; water would constitute 3% of the total weight of the egg white portion of the formulated fried egg product; Purity starch would constitute 2% of the total weight of the egg white portion of the formulated fried egg product; salt would constitute 0.8% of the total weight of the egg white portion of the formulated fried egg product; propylene glycol would constitute 0.2% of the total weight of the egg white portion of the formulated fried egg product; xanthan gum would constitute 0.1% of the total weight of the egg white portion of the formulated fried egg product; white pepper would constitute 0.04% of the total weight of the egg white portion of the formulated fried egg product; and citric acid would constitute 0.02% of the total weight of the egg white portion of the formulated fried egg product.

In yet another alternative formula the egg white portion would include egg whites forming 97.2% of the total weight of the egg white portion of the formulated fried egg product; polar gel would constitute 2.5% of the total weight of the egg white portion of the formulated fried egg product; xanthan gum would constitute 0.2% of the total weight of the egg white portion of the formulated fried egg product; and citric acid would constitute 0.1% of the total weight of the egg white portion of the formulated fried egg product.

In yet another alternative formula the egg white portion would include egg whites forming 85.6% of the total weight of the egg white portion of the formulated fried egg product; water would constitute 10% of the total weight of the egg white portion of the formulated fried egg product; non-fat dry milk would constitute 1% of the total weight of the egg white portion of the formulated fried egg product; purity W modified food starch would constitute 2% of the total weight of the egg white portion of the formulated fried egg product; salt would constitute 0.4% of the total weight of the egg white portion of the formulated fried egg product; and natural flavor for fried egg would constitute 1% of the total weight of the egg white portion of the formulated fried egg product.

A formula for the egg yolk portion of the formulated fried egg product would constitute egg yolks forming 99.57% of the total weight of the egg yolk portion of the formulated fried egg product; xanthan gum would form 0.225% of the total weight of the egg yolk portion of the formulated fried egg product; and salt would constitute 0.4% of the total weight of the egg yolk portion of the formulated fried egg product.

In yet another formula for the egg yolk portion of the formulated fried egg product would constitute egg yolks forming 50% of the total weight of the egg yolk portion of the formulated fried egg product; whole egg would constitute 49.55% of the total weight of the egg yolk portion of the formulated fried egg product; and xanthan gum would form 0.45% of the total weight of the egg yolk portion of the formulated fried egg product.

In yet another formula for the egg yolk portion of the formulated fried egg product would constitute egg yolks forming 50.05% of the total weight of the egg yolk portion of the formulated fried egg product; hard cooked yolk would constitute 39.83% of the total weight of the egg yolk portion of the formulated fried egg product; water would constitute 10% of the total weight of the egg yolk portion of the formulated fried egg product; xanthan gum would constitute 0.05% of the total weight of the egg yolk portion of the formulated fried egg product; propylene glycol would constitute 0.05% of the total weight of the egg yolk portion of the formulated fried egg product; and citric acid would constitute 0.02% of the egg yolk portion of the formulated fried egg product.

In yet another formula for the egg yolk portion of the formulated fried egg product would constitute egg yolks forming 79.9% of the total weight of the egg yolk portion of the formulated fried egg product; egg whites would constitute 19.5% of the total weight of the egg yolk portion of the formulated fried egg product; xanthan gum would constitute 0.25% of the total weight of the egg yolk portion of the formulated fried egg product; carrageenan would constitute 0.25% of the total weight of the egg yolk portion of the formulated fried egg product; and citric acid would constitute 0.1% of the total weight of the egg yolk portion of the formulated fried egg product.

The procedures identified herein enable individual formulated fried eggs to be held frozen, refrigerated and/or hot for extended periods of time without loss of product integrity.

The temperature of the formulated fried egg within the mold 10 following freezing is verified to not exceed 36° F. or 2.22° C. The frozen formulated fried eggs may then be packaged in poly lined bags and stored in a freezer for future transportation, delivery, reheating, and consumption by an individual.

EXAMPLES

Example I

Initially, shell eggs were broken and separated into liquid egg yolk portions and liquid egg white portions by commercial egg shelling and separation techniques. 600.6 grams of liquid egg yolk were placed into a mixing vessel. Next, 120 ml. of cold water was combined with 477.96 grams of hard cooked egg yolk in a mixer whereupon mixing occurred. Next, 0.6 grams of propylene glycol were combined to 0.6 grams of xanthan gum in a bucket where mixing occurred through use of a whisk. Next, 0.24 grams of citric acid were added to the glycol/gum mixture whereupon mixing occurred. The mixed glycol/gum/citric acid mixture and water/hard cooked egg yolk mixture were added to the liquid egg yolk where agitation occurred. The mixed yolk portion was then transferred to a heat exchanger for preheating to a temperature just below the yolk coagulation point. The preheated liquid egg yolk portion was then pumped to a yolk depositor.

3,753.6 grams of egg whites were added to a mixing vessel. Next, 120 ml. of hot water were combined with 80 grams of modified food starch where mixing occurred. Next, 8 grams of propylene glycol and 4 grams of xanthan gum were then added to a bucket and mixed with a whisk. The glycol/gum mixture was then added to the water/starch mixture whereupon mixing occurred. The resulting mixture was combined with the liquid egg whites where mixing occurred.

The liquid egg white portion was then transferred to a heat exchanger for preheating. The preheated liquid egg white portion was then pumped to a egg white depositor for placement within a plurality of molds. The molds containing the preheated liquid egg white portion were then exposed to heat of approximately 325° F. or 162.78° C. The mold was then transferred to a yolk depositor whereupon a desired volume of preheated egg yolk was deposited upon the heated egg white portion. The molds containing the egg white portion and egg yolk portion were then transferred to a convection oven whereupon cooking occurred for 7.75 minutes at a temperature of 325° F. or 162.78° C. with the humidity set at full steam with the dampers closed. Following cooking the molds were transferred to a cooling area where the molds were permitted to cool at room temperature for a period of 30 minutes. Next, the cooled molds of formulated fried eggs were transferred to a cryogenic Spyro freezer for quick freezing. Following freezing, the frozen formulated fried eggs were separated from the molds for packaging and storage. Next, the packaged frozen formulated fried eggs were thawed and were reheated within a microwave oven at a low power setting where the formulated fried eggs were covered with microwave compatible plastic to prevent dehydration, skin formation, and/or crusting. The formulated fried obtained according to the above-identified methodology provided a superior formulated fried egg resembling a natural fried egg in appearance, taste, and mouth feel.

Example II

Initially, shell eggs were broken and separated into liquid egg yolk portions and liquid egg white portions by commercial egg shelling and separation techniques. 958.8 grams of liquid egg yolk were added to a mixing vessel. Next, 234 grams of egg whites were combined with 2.99 grams of xanthan gum and 2.99 grams of carrageenen whereupon mixing occurred. Next, 1.20 grams of citric acid were added to the egg white/gum/carrageenen mixture whereupon mixing occurred. The resulting mixture was then added to the liquid egg yolk where agitation occurred. The mixed yolk portion was then transferred to a heat exchanger for preheating to a temperature just below the yolk coagulation point. The preheated liquid egg yolk portion was then pumped to a yolk depositor.

2,430 grams of liquid egg whites were added to a mixing vessel. Next, 62.5 grams of polar gel were combined with 5 grams of xanthan gum and 2.5 grams of citric acid whereupon mixing occurred. The mixed polar gel/gum/citric acid was then added to the liquid egg yolks whereupon mixing occurred. The liquid egg white portion was then transferred to a heat exchanger for preheating. The preheated liquid egg white portion was then pumped to a egg white depositor where placement within a plurality of molds occurred. The molds containing the preheated liquid egg white portions were then exposed to heat of approximately 375° F. or 190.56° C. The molds were then transferred to a yolk depositor where a desired volume of egg yolk was deposited upon the egg white portion. The molds containing the egg white portion and egg yolk portion were then transferred to a convection oven where cooking occurred for 6.5 minutes at a temperature of 375° F. or 190.56° C. with the humidity set at full steam with the oven dampers closed. Following cooking, the molds were transferred to a cooling area where the molds were cooled at room temperature for a period of 30 minutes. Next, the cooled molds of formulated fried eggs were transferred to a cryogenic Spyro freezer for quick freezing. Following freezing, the formulated fried eggs were separated from the molds for packaging and storage. Next, the package for frozen formulated fried eggs were thawed and were reheated within a microwave oven at a low power setting where the formulated fried eggs were covered with microwave compatible plastic to prevent dehydration, skin formation, and/or crusting. The formulated fried eggs obtained according to the above-identified methodology provided a superior formulated fried egg resembling a natural fried egg in appearance, taste, and mouth feel.

Example III

Initially, shell eggs were broken and separated into liquid egg yolk portions and liquid egg white portions by commercial egg shelling and separation techniques. 500 grams of liquid egg yolk were added to a mixing vessel. Next, 495.5 grams of whole egg and 4.5 grams of xanthan gum were placed in a mixing vessel and mixed. The mixed whole egg and gum were then added to the liquid egg yolk whereupon mixing occurred. The mixed yolk portion was then transferred to a heat exchanger for preheating to a temperature just below the yolk coagulation point. The preheated liquid egg yolk portion was then pumped to a yolk depositor.

890.5 grams of liquid egg whites were added to a mixing vessel. Next, 80 grams of soy bean oil, 25 grams of polar gel, 5 grams of salt, and 0.5 grams of xanthan were added to a mixing vessel and mixed. The mixed oil/gel/salt/gum was then added to the liquid egg whites where mixing occurred. The liquid egg white portion was then transferred to a heat exchanger for preheating. The preheated liquid egg white portion was then pumped to an egg white depositor where placement within a plurality of molds occurred. The molds containing the preheated liquid egg white portions were then exposed to heat of approximately 375° F. or 190.56° C. The molds were then transferred to a yolk depositor where a desired volume of egg yolk was placed upon the egg white portion within the mold. The molds containing the egg white portion and egg yolk portion were then transferred to a convection oven where cooking occurred for 6.5 minutes at a temperature of approximately 375° F. or 190.56° C. where full steam was provided for the final one-third of the cooking time. The oven dampers closed during the final one-third of the cooking time to maximize humidity. Following cooking, the molds containing the cooked formulated fried eggs were transferred to a cooling area where the molds were cooled at room temperature for a period of 30 minutes. Next, the cooled molds of formulated fried eggs were transferred to a cryogenic Sypro freezer for quick freezing. Following freezing, the frozen formulated fried eggs were separated from the molds for packaging and storage. Next, the packaged frozen formulated fried eggs were thawed and were reheated within a microwave oven at a low power setting where the formulated fried eggs were covered with microwave compatible plastic to prevent dehydration, skin formation, and/or crusting. The formulated fried eggs obtained according to the above-identified methodology provided a superior formulated fried egg resembling a natural fried egg in appearance, taste, and mouth feel.

The above-identified ingredients, temperature, and processing procedures resulted in a formulated fried egg having increased thickness, improved color, texture, mouth feel, and the over all appearance of a naturally fried egg.

It should be noted that the process steps identified above may be substantially interchained and modified without sacrifice as to the final formulated fried egg so long as temperature is regulated and mixing time is regulated to avoid excessive temperatures and over mixing.

In general, the ingredients identified herein have been provided for illustrative purposes and should not be considered as restrictive. In addition, reference herein to modified food starch may generally include a wide variety of commercially available corn starches and/or potato starches used in food products which are FDA approved for consumption by individuals. In addition, certain sugars may be used as substitutes for or in combination with either of the modified food starches identified herein. Further, reference herein to soy oil and/or corn oil may include reference to other edible oils namely peanut oil, and vegetable oils. It should also be noted that a number of alternative edible oils may adequately function as substitute ingredients for the identified soy bean oil and/or corn oil herein.

Carboxymethylcellulose, carrageenan, guar gums, locust bean gum, beta carotene, agar, glycerol mono stearate, mono diglycerides and polypropylene glycol esters may function as acceptable substitutes and/or replacements for the xanthan gum and the gums and emulsifiers herein. Further, other milk products may be substituted for the non-fat dry milk and whey as used herein for incorporation into the consumable food product including eggs.

It should be noted that the percentage weights provided herein have been rounded mathematically which in certain instances may not exactly equal 100%. In these instances, the percentage of eggs and/or water may be insignificantly increased or decreased to provide a 100% summation.

The above examples and disclosure are intended to be illustrative and not exhaustive. These examples and description will suggest many variations and alternatives to one of ordinary skill in the art. All of these alternatives and variations are intended to be included within the scope of the attached claims. Those familiar with the art may recognize other equivalents to the specific embodiments described herein which equivalents are also intended to be encompassed by the claims attached hereto.

The present invention may be embodied in other specific forms without departing from the spirit or essential attributes thereof; therefore, the illustrative embodiments should be considered in all respects as illustrative and not restrictive, reference being made to dependent claims rather than to the foregoing description to indicate the scope of the invention.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below (e.g. claim 3 may be taken as alternatively dependent from claim 2; claim 4 may be taken as alternatively dependent on claim 2, or on claim 3; claim 6 may be taken as alternatively dependent from claim 5; etc.).

This completes the description of the preferred and alternate embodiments of the invention. Those skilled in the art may recognize other equivalents to the specific embodiment described herein which equivalents are intended to be encompassed by the claims attached hereto.

The invention claimed is:

1. A process for making a formulated fried egg, the process comprising:
   a) forming an egg white portion comprising egg whites that form between about 50% and 99.5% by weight of the egg white portion, oil that forms between about 2% and 10% by weight of the egg white portion, and salt;
   b) forming an egg yolk portion comprising egg yolk that forms between about 50% and 99.9% by weight of the egg yolk portion and gum;
   c) preheating the egg white portion separately from the egg yolk portion;
   d) depositing a desired amount of the egg white portion into a mold;
   e) depositing a desired amount of the egg yolk portion into the mold;
   f) cooking the desired egg yolk amount and desired egg white amount in the mold;
   g) removing the cooked egg yolk portion and egg white portion from the mold; and
   h) cooling the cooked and removed egg yolk portion and egg white portion.

2. The process of claim 1, wherein depositing the egg yolk portion is performed before depositing the egg white portion.

3. The process of claim 1, wherein depositing the egg yolk portion and egg white portion is performed using a depositor and in which the mold is positioned beneath the depositor prior to the egg yolk portion and the egg white portion being deposited.

4. The process of claim 1, further comprising pre-heating the egg yolk portion prior to depositing the egg yolk portion.

5. The process of claim 1, the egg white portion further comprising modified food starch, the modified food starch forming between 1% and 3% by weight of the egg white portion.

6. The process of claim 5, the egg yolk portion further comprising citric acid, the citric acid forming between 0.01% and 0.2% by weight of the egg yolk portion.

7. The process of claim 6, in which the egg white portion forms approximately 50% by weight of the formulated fried egg.

8. The process of claim 6, in which the egg white portion further comprises gum, the gum forming between 0.01% and 0.4% by weight of the egg white portion.

9. The process of claim 6, in which the egg yolk portion further comprises salt, the salt forming between 0.01% and 0.5% by weight of the egg yolk portion.

10. The process of claim 1, further comprising degassing the egg white portion prior to the depositing of the egg white portion.

11. The process of claim 10, wherein the degassing includes subjecting the egg white portion to a vacuum.

12. The process of claim 1, wherein the salt forms between 0.35% and 0.8% by weight of the egg white portion.

13. The process of claim 1, wherein the gum forms between 0.1% and 0.5% by weight of the egg yolk portion.

14. A method for making a formulated fried egg, the formulated fried egg comprising 1) an egg white portion including egg whites that form between about 50% and 99.5% by weight of the egg white portion, oil that forms between about 2% and 10% by weight of the egg white portion, and salt; and 2) an egg yolk portion including egg yolk, that forms between about 50% and 99.9% by weight of the egg yolk portion and gum, wherein the formulated fried egg is formed according to a method comprising the steps of:
   a) separately preheating the egg white portion and the egg yolk portion;
   b) transferring the preheated egg white portion to an egg white depositor;
   c) transferring the preheated egg yolk portion to an egg yolk depositor;
   d) positioning a mold to receive a desired volume of egg white portion;
   e) moving the mold containing the egg white portion to the egg yolk depositor for receipt of a desired volume of egg yolk portion on top of the egg white portion;
   f) cooking the egg white portion and the egg yolk portion within the mold;
   g) cooling the mold;
   h) transferring the mold containing the formulated fried egg to a freezer for freezing of the formulated fried egg;
   i) separating the frozen formulated fried egg from the mold;
   j) packaging the frozen formulated fried egg;
   k) thawing the formulated fried egg; and
   l) reheating the formulated fried egg by exposure to heat.

15. The method of making a formulated fried egg according to claim 14, wherein the egg white portion is degassed.

16. The method of making a formulated fried egg according to claim 14, wherein the cooking of the egg is performed in a high-moisture atmosphere.

17. The method of making a formulated fried egg according to claim 14, wherein the egg white portion further comprises modified food starch, the modified food starch forming between 1% and 3% by weight of the egg white portion wherein the amount of the egg whites, the oil, the salt, and modified food starch when combined equal 100% of the egg white portion.

18. The method of making a formulated fried egg according to claim 14, wherein the egg yolk portion further comprises citric acid, the citric acid forming between 0.01% and 0.2% by weight of the egg yolk portion wherein the amount of the egg yolk, the gum, and citric acid when combined equal 100% of the egg yolk portion.

19. The method of making a formulated fried egg according to claim 14, wherein the egg white portion forms approximately 50% by weight of the formulated fried egg.

20. The method of making a formulated fried egg according to claim 14, wherein the egg white portion further comprises gum, the gum forming between 0.01% and 0.4% by weight of the egg white portion wherein the amount of the egg whites, the oil, the salt, modified food starch, and gum when combined equal 100% of the egg white portion.

21. The method of making a formulated fried egg according to claim 14, wherein the egg yolk portion further comprises salt, the salt forming between 0.01% and 0.5% by weight of the egg yolk portion wherein the amount of the egg yolk, the gum, the citric acid, and the salt when combined equal 100% of the egg yolk portion.

22. The method of making a formulated fried egg according to claim 14, wherein the egg white portion further comprises water, the water forming between 2.5% and 11% by weight of the egg white portion, wherein the amount of the egg whites, the oil, the salt, modified food starch, gum, and the water when combined equal 100% of the egg white portion.

23. The method of making a formulated fried egg according to claim 14, wherein the egg yolk portion further comprises egg white, the egg white forming between 0.01% and 21% by weight of the egg yolk portion, wherein the amount of the egg yolk, the gum, citric acid, salt, and the egg white when combined equal 100% of the egg yolk portion.

24. The method of making a formulated fried egg according to claim 14, wherein the egg white portion further comprises polar gel, the polar gel forming between 0.45% and 3% by weight of the egg white portion.

25. The method of making a formulated fried egg according to claim 14, wherein the egg yolk portion further comprises water, the water forming between 0.01% and 16% by weight of the egg yolk portion.

26. The method of making a formulated fried egg according to claim 14, wherein the egg white portion further comprises citric acid, the citric acid forming between 0.01% and 0.2% of the egg white portion.

27. The method of making a formulated fried egg according to claim 14, wherein the egg yolk portion further comprises carrageenen, the carrageenen forming between 0.01% and 0.4% by weight of the egg yolk portion.

28. The method of making a formulated fried egg according to claim 14, wherein the egg yolk portion further comprises whole egg, the whole egg forming between 0.01% and 50% by weight of the egg yolk portion.

29. The method of making a formulated fried egg according to claim 14, wherein the egg yolk portion further comprises hard cooked egg yolk, the hard cooked egg yolk forming between 0.01% and 50% by weight of the egg yolk portion.

30. The method of making a formulated fried egg according to claim 14, wherein the egg yolk portion further comprises propylene glycol, the propylene glycol forming between 0.01% and 0.2% by weight of the egg yolk portion.

31. The method of making a formulated fried egg according to claim 14, wherein the egg white portion further comprises propylene glycol, the propylene glycol forming between 0.1% and 0.3% by weight of the egg white portion.

32. The method of making a formulated fried egg according to claim 14, wherein the gum is selected from the group consisting of xanthan gum, guar gum, carboxymethylcellulose, carrageenen, locust bean gum, beta carotene, agar, glycerol mono stearate, monodiglycerides, propylene glycol, polypropylene glycol, and glycol esters and any combination thereof.

33. The method of making a formulated fried egg according to claim 17, wherein the modified food starch is selected from the group consisting of Purity starch, corn starch, potato starch, sugar, and corn syrup solids and any combination thereof.

34. The method of making a formulated fried egg according to claim 14, wherein the oil is selected from the group consisting of soy oil, corn oil, peanut oil, and vegetable oil and any combination thereof.

* * * * *